July 22, 1924.
T. B. MUNROE
1,501,966
DRYING APPARATUS
Filed Dec. 3, 1921
9 Sheets-Sheet 7
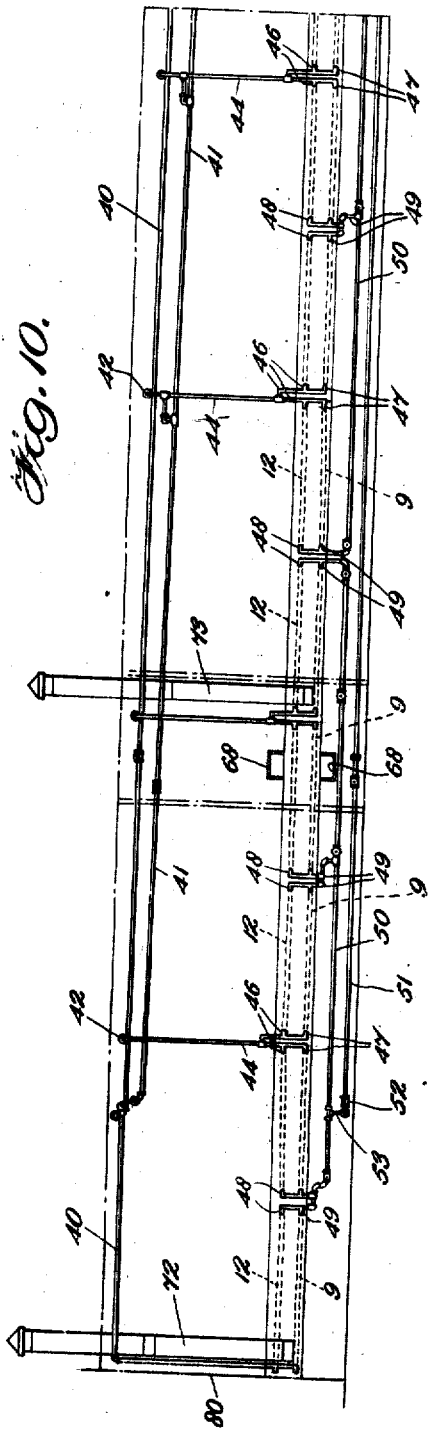
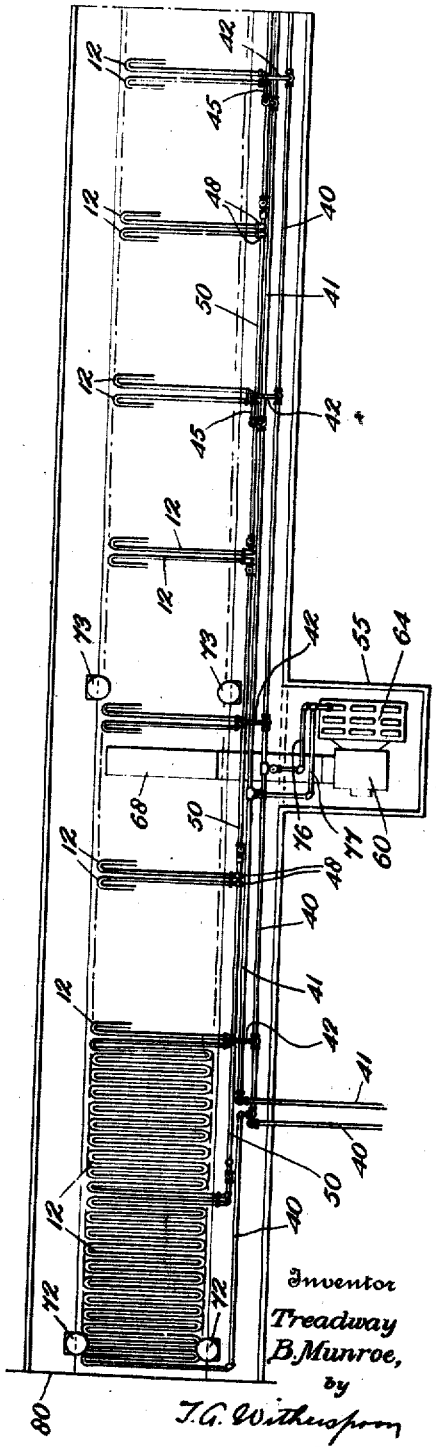
Inventor
Treadway B. Munroe,
by
J. G. Witherspoon
Attorney July 22, 1924.
T. B. MUNROE
DRYING APPARATUS
Filed Dec. 3, 1921
1,501,966
9 Sheets-Sheet 8
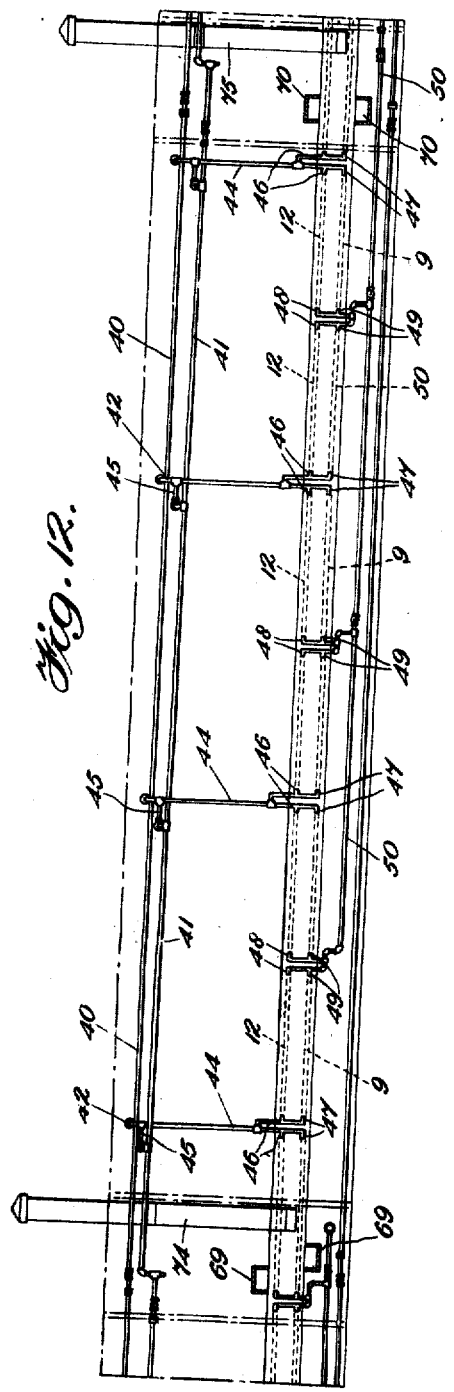
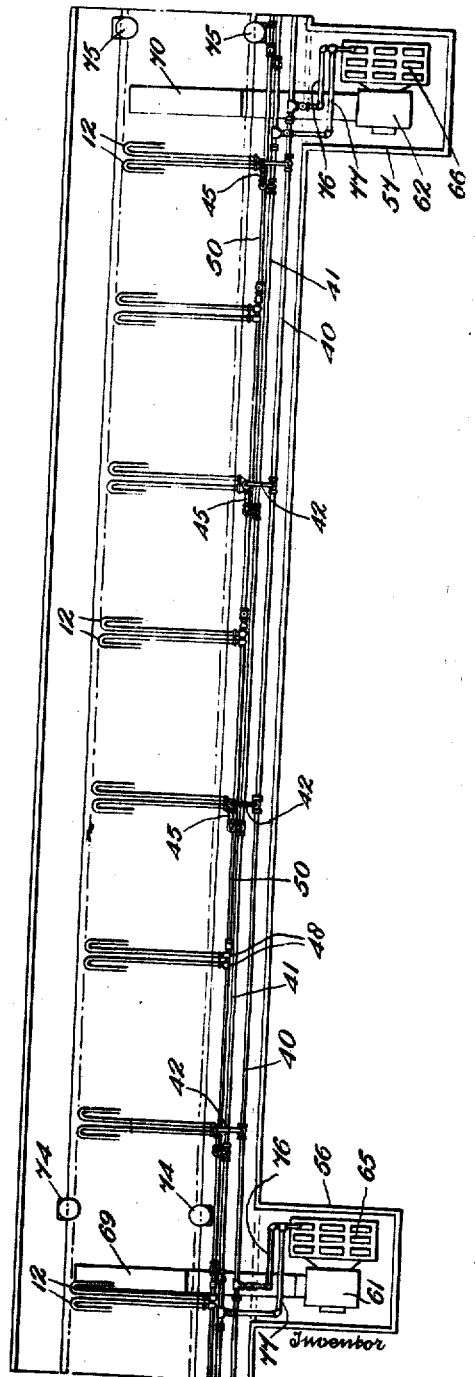
Treadway B. Munroe, by
T. G. Witherspoon
Attorney July 22, 1924.
T. B. MUNROE
1,501,966
DRYING APPARATUS
Filed Dec. 3, 1921
9 Sheets-Sheet 9
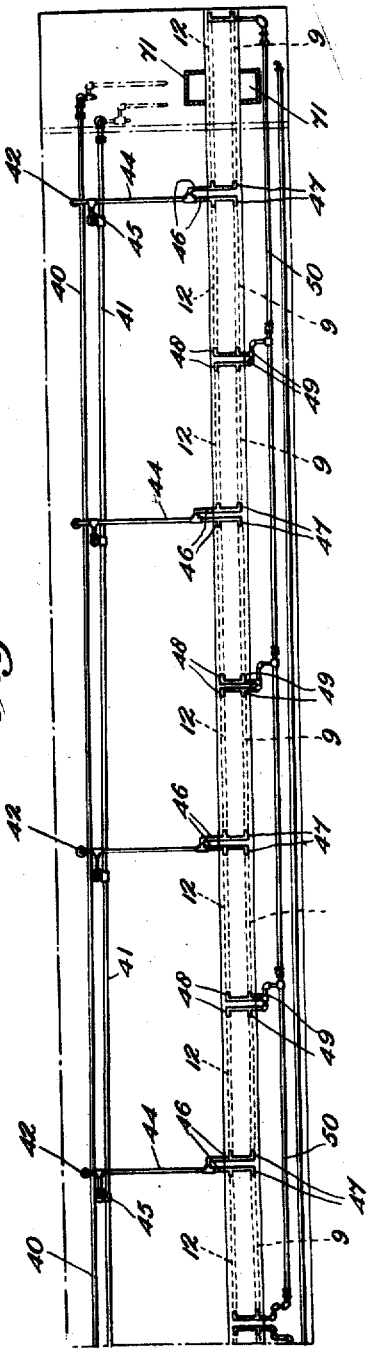
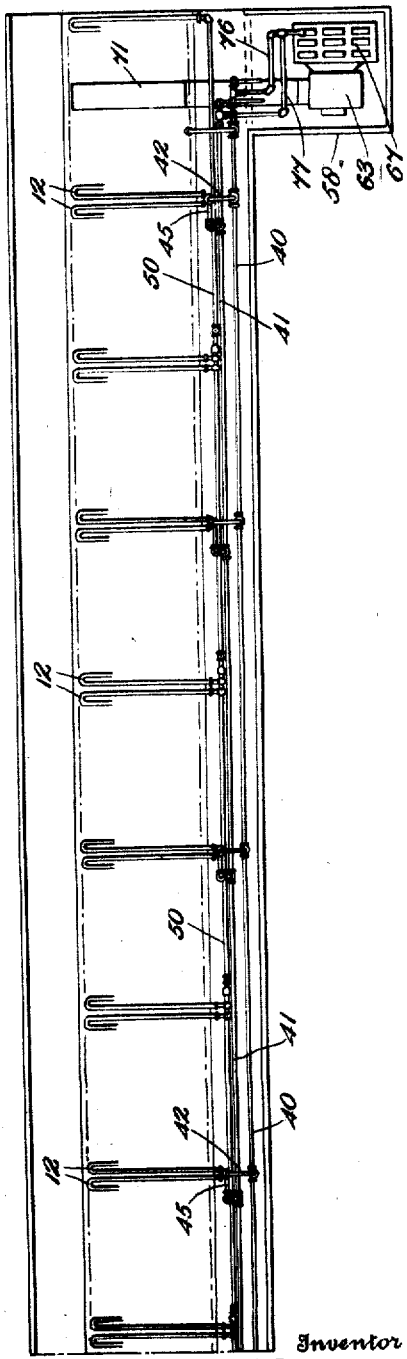
Inventor
Treadway B. Munroe, by
T. G. Witherspoon
Attorney Patented July 22, 1924.

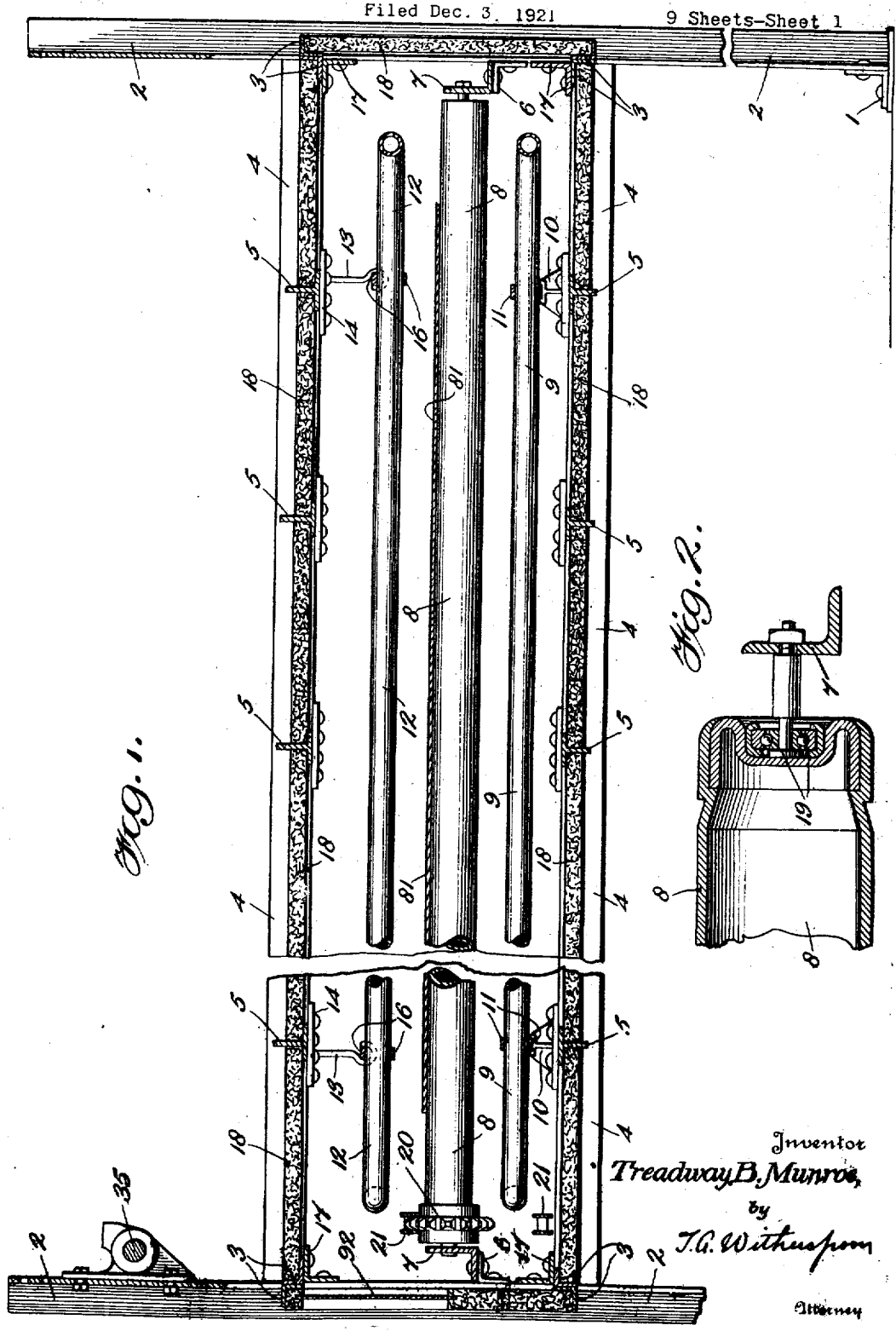

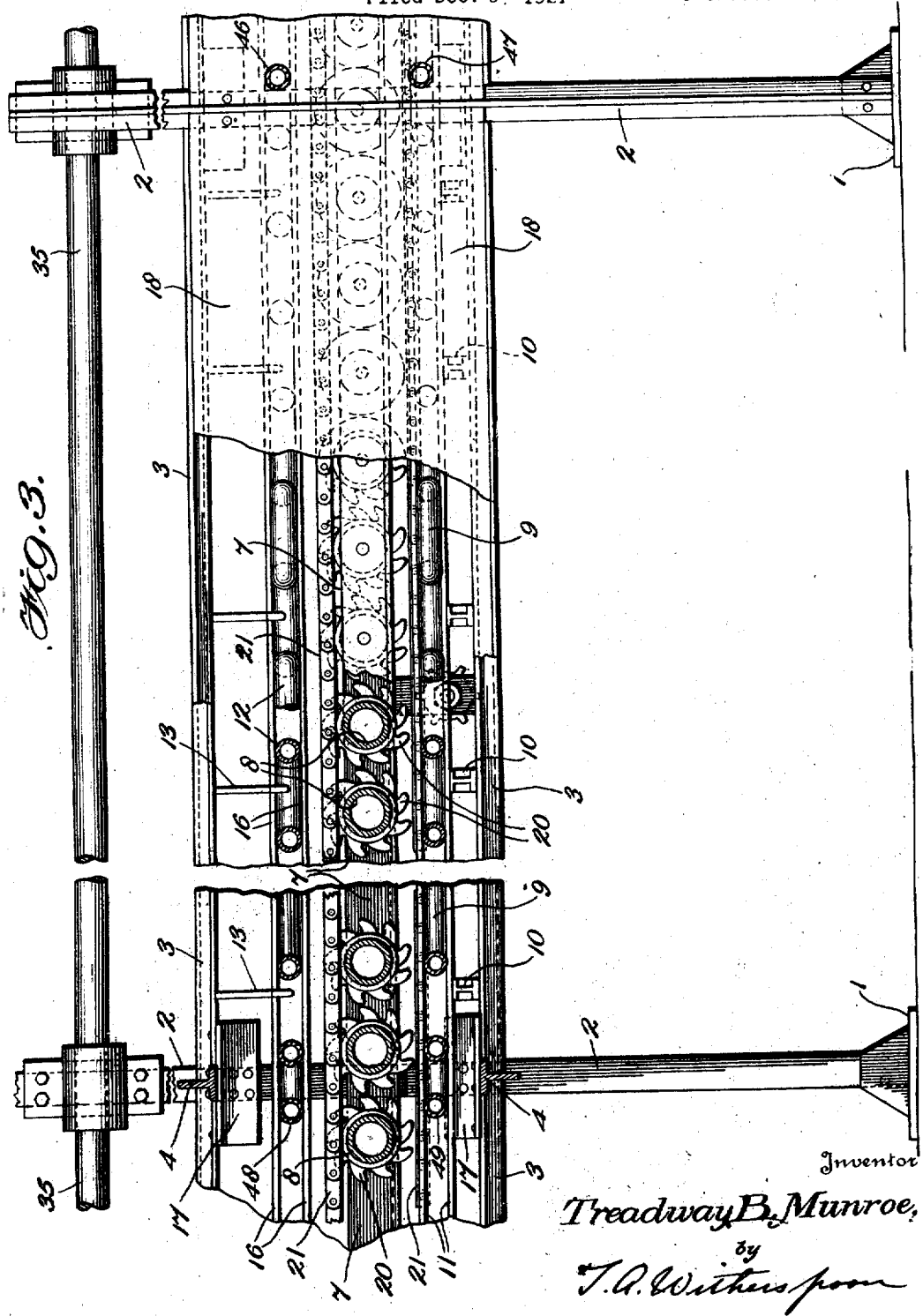

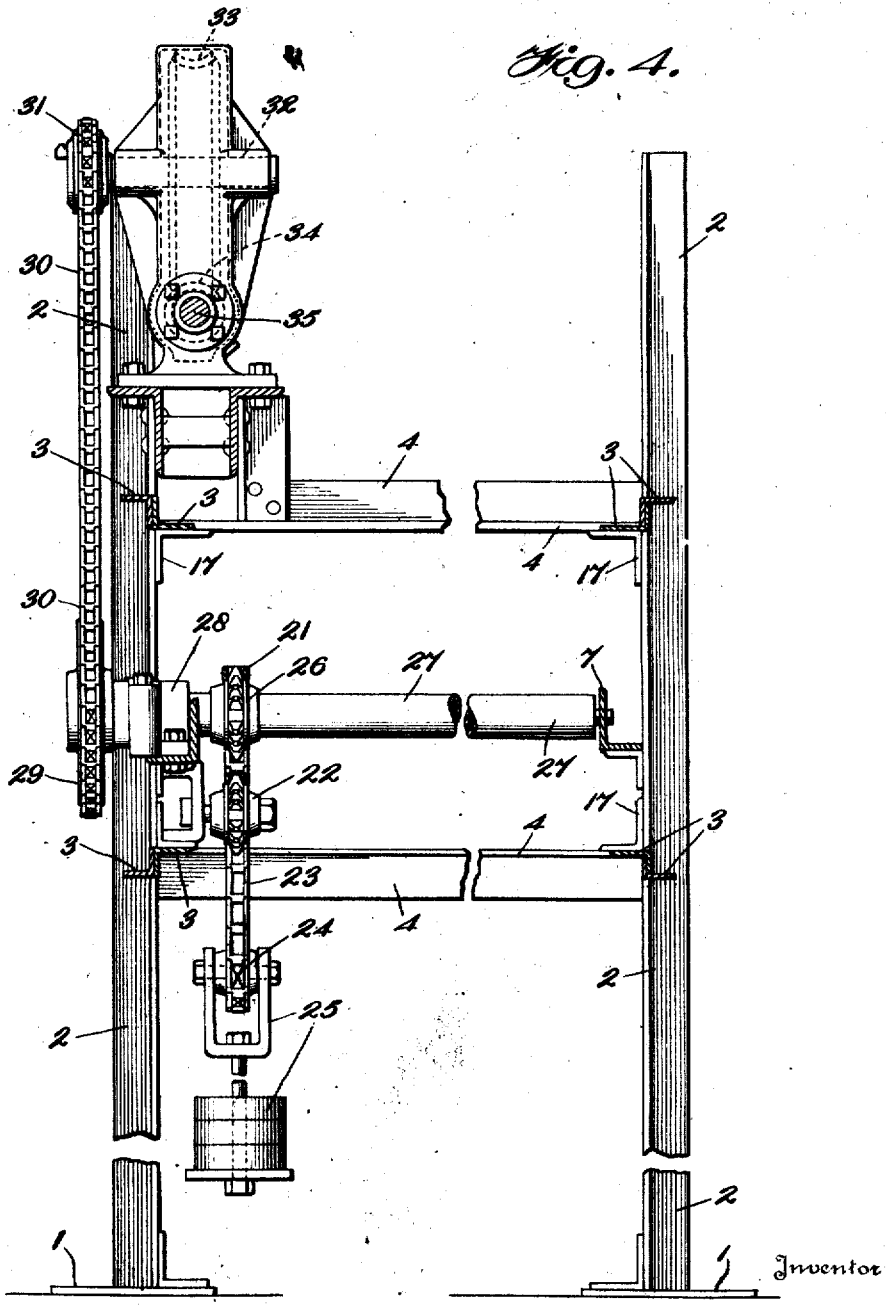

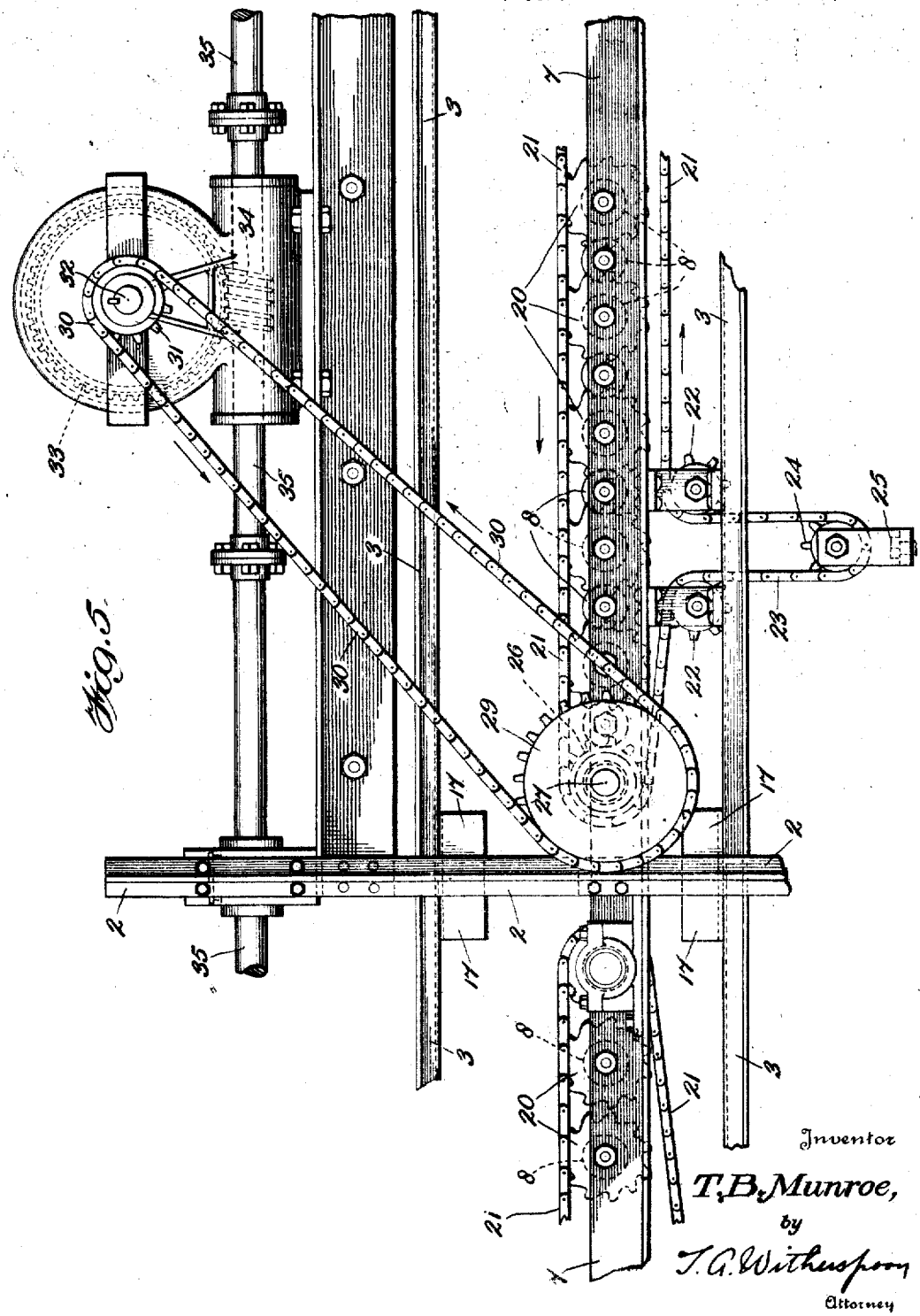

1,501,966

UNITED STATES PATENT OFFICE.

TREADWAY B. MUNROE, OF NEW ORLEANS, LOUISIANA, ASSIGNOR TO C. F. DAHLBERG, OF NEW ORLEANS, LOUISIANA.

DRYING APPARATUS.

Application filed December 3, 1921. Serial No. 519,748.

*To all whom it may concern:*

Be it known that I, TREADWAY B. MUNROE, a citizen of the United States, residing at New Orleans, in the parish of Orleans and State of Louisiana, have invented certain new and useful Improvements in Drying Apparatus; and I do hereby declare the following to be a full, clear, and exact description of the invention, such as will enable others skilled in the art to which it appertains to make and use the same.

This invention relates to drying apparatus and has for its object to provide a means of drying what is known as "heat insulating wall boards." These said boards are fed to the drier continuously and are cut off after passing therethrough. They are say ¼ to 1 and ½ in. thick and from, say, 8 to 15 feet wide. The object of the invention, more specifically stated, therefore, is to provide an efficient means of drying these boards in a less time than it has been possible heretofore to do.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a diagrammatic sectional view of a drier chamber made in accordance with this invention;

Figure 2 is a sectional detail view of an end of one of the conveyer rolls;

Figure 3 is a side elevational view partially broken away of a portion of the drying chamber shown in Figure 1;

Figure 4 is a diagrammatic view partly in section illustrating the frame work and the driving chains of a set of conveyer rollers;

Figure 5 is a side elevational view of the parts shown in Figure 4;

Figure 6 is a diagrammatic side elevational view of one half of the complete drier;

Figure 7 is a diagrammatic elevational view of that portion of the complete drier which is not shown in Figure 6;

Figure 8 is a diagrammatic plan view of a plurality of sets of upper drying coils;

Figure 9 is an end elevational view partially in section of a portion of the parts shown in Figure 8 with the heating coils 9 and 12 added thereto;

Figure 10 is a diagrammatic side elevational view partly in section, of the heating system beginning at the wet end of the drier;

Figure 11 is a plan view of the parts shown in Figure 10;

Figure 12 is a continuation in elevation of the parts shown in Figure 10;

Figure 13 is a continuation in plan of the parts shown in Figure 11;

Figure 14 is a continuation in elevation of the parts shown in Figure 12 and finishing at the dry end of the drier; and Figure 15 is a continuation in plan of the parts shown in Figure 13 also ending at the dry end of the drier.

In order that this invention may be the better understood, it is said: Heat insulating wall boards are now made from fibers in continuous sheets of from say 10 to 15 feet wide and from ½ to 1½ inches thick and are cut into suitable lengths and widths as fast as they come from the drier.

These wet fibrous sheets must be dried uniformly throughout their masses and in such a way as to avoid warping, so that they will be of a uniform strength and have flat surfaces. To comply with these conditions, this invention provides a closed box like structure several hundred feet long, which is supplied with air and steam coils to dry the sheets and with means for conveying said sheets in continuous lengths from one end of the structure to the other, as will now be disclosed.

Referring more particularly to Figs. 1 and 3, 1 indicates any suitable foundation on which are supported the uprights 2, and 3 represent top and bottom horizontally disposed longitudinal members tying the uprights into a rigid frame work of several hundred feet in length. Extending across this frame work between the frame members 3 are the transverse beam like members 4, see Figs. 1, 3 and 4, which support the top and bottom sides of the box like drying chamber. Supported from said beams 4 are the top and bottom horizontally disposed frame members 5, located between the vertical sides of the drying chamber and running from end to end of the structure. Secured to each of the vertical uprights 2 are the angle brackets 6, on which are mounted the angle iron members 7 forming bearings for the rollers 8 which convey the continuous lengths of wet board being dried from end to end of the structure. Said roller members 8, as best shown in Fig. 2, are mounted on ball bearings 19 which have their support in said plates 7, so that they offer very little frictional resistance to the passage of said boards and their tops being all in the same horizontal plane they permit the boards to dry in a flat condition free from warpings.

Below said rollers 8 is a plurality of pipe coils 9, all in a horizontal plane which are supported upon the block members 10, see Figs. 1 and 3, and which are secured in position by the strip like members 11. The said strip like members 11 are located above and below the coils 9 and extend longitudinally of the entire drier. Likewise above the said rollers 8 is a second series of pipe coils 12, which are hung from the supports 13 secured to the longitudinally disposed members 5, and these said coils 12 are likewise provided with supporting strip like members 16, located above and below the same, which members also extend from end to end of the drying chamber, as will be clear from the drawings.

Suitable stiffening brackets 17 are located in the angles formed by the members 3 and 4 and secured to the uprights 2, as shown in Figs. 1, 3, 4 and 5. Secured around the entire outside of the frame work just described and from end to end thereof are the heat insulating slabs or boards 18, which may be made of asbestos, or of other suitable material such as the heat insulating material known on the market as "Celotex," which it is intended to dry by this invention.

In order to bodily move the fibrous wet boards from end to end of the drying chamber formed by the construction now disclosed, conveyer rolls 8 are provided at one end with the sprockets 20, over which passes a sprocket chain 21, which being of a rather long length is also passed over the guide sprockets 22, see Fig. 5, and the looped portion 23 between said sprockets is provided with a third sprocket 24 to which the weight 25 is attached, thus providing a means for keeping tight said sprocket chain or belt 21 under all conditions as will be clear from Figs. 4 and 5. Since the entire drying chamber is several hundred feet long and since it is impracticable to operate a single sprocket chain over such a distance, the conveyer rolls 8 are divided into four sections, see Figs. 6 and 7, and a separate chain 21 and its co-acting parts are provided for each section. The driving sprocket 26 for each section is mounted on a shaft 27 supported in bearings 28 carrying at its outer end the large driving sprocket 29 over which passes the driving chain 30 driven from the sprocket 31 mounted on the shaft 32 carrying the worm wheel 33 meshing with the worm 34 rigid with the shaft 35, all as is best shown in Fig. 5. Said shaft 35 extends substantially from end to end of the drying chamber, so that it has a worm 34 for each section of conveyer rolls, and is driven from a suitable motor 36, see Fig. 7.

The heating system comprises the high pressure steam pipe 40, see Fig. 9, and the low pressure steam pipe 41. The connection 42 from said pipe 40 having the valve 43 leads to the pipe 44, and the connection 45 having the valve 46 leads from said pipe 41, also to said pipe 44. The high pressure pipe 40 and low pressure pipe 41 extend from end to end of the drier as seen in Figs. 10 to 15, and there are a plurality of connections 42 and 45 tapped off from said high and low pressure pipes respectively, to feed corresponding pipes 44, which latter in turn feed a plurality of sets of heating coils 9 and 12 located at intervals from end to end of the drier, all as will be clear from what follows, taken in connection with Figs. 8 to 15.

That is to say, as best shown in Figs. 8 and 9, the pipe 44 feeds the connections 46 and 47 leading to the heating coils 12 and 9 respectively and similar connections are had with each of the other sets of coils 12 and 9, throughout the length of the drier, as will be clear from the drawings.

Each set of coils 9 and 12 is also provided with the drain connections 49 and 48 respectively which lead into the common drain pipe 50, see Figs. 8, 10, 12 and 14.

Alongside the drain pipe 50 is a pipe 51, which is conveniently connected to the pipe 50, through the valve 52 by the joint 53, see Fig. 10, and which thus supplies hot water to the boiler feed or for any other desired purpose.

In addition to the heating system described above, this drier is provided with a hot air system which will now be disclosed. At suitable stations 55, 56, 57 and 58, see Figs. 11, 13 and 15, are located fans 60, 61, 62 and 63 respectively, which suck air through the steam heated coils 64, 65, 66, and 67 respectively, and force it through the conduits 68, 69, 70 and 71 respectively into the drier chamber below and above the sets of coils 9 and 12, all as will be clear from Figs. 11, 13 and 15. The air thus forced between the various sets of coils 9 and 12 by the respective fans escapes from the drying chamber through the passages or ventilators 72, 73, 74, and 75 respectively and thus does the air travel in a direction opposite to that of the conveyer.

The air heating steam coils 64, 65, 66 and 67 are supplied with steam from the live steam pipes 40 and 41, through the respective connections 76 and 77.

The operation of this drier may be summarized as follows: The wet end of the drying chamber, see Figs. 1, 10 and 11, is joined as at 80 with the delivery end, not shown, of the fiber board making machine, and the wet pulpy sheets of board material 81, see Fig. 1, several feet wide and from say ¼ to 1 and ½ inches thick, are received on the conveying rollers 8, which are divided into sets, and each set kept in a continuous rotation by separate sprocket chains 21 throughout the length of the drier. Each sprocket chain 21 is kept tight by a loop 23 and weight 25, and is driven by a master sprocket chain 30, each deriving its power from a shaft 35 and worm and gear connections 34, 33, as best shown in Figs. 5, 6 and 7, while the power shaft 35 extends from end to end of the drier and derives its power from the motor 36, see Fig. 7.

Throughout the length of the drying chamber there is provided a plurality of sets of lower steam coils 9, and a plurality of sets of upper steam coils 12, see Figs. 1, 8, 9, and 10 to 15. These sets of coils 9 and 12 are fed from a high pressure steam pipe 40, as well as from a low pressure steam pipe 41, so that the temperature in the drying chamber can be regulated to suit the weather as well as the character of the fiber boards being dried. That is to say, as will be clear from Figs. 8, 9, and 10 if a very high temperature is desired in the said drying chamber the valves 46, Fig. 9, will be closed for each set of coils 9 and 12, and the valves 43 opened, whereupon high pressure steam will pass through the connections 44, 46 and 47 associated with said sets of coils, and will be drained out at the other end of each coil into the pipe 50 through the connections 48 and 49 associated with the draining ends of said coils. On the other hand, if a low temperature is desired in the sets of coils 9 and 12, the valves 43 are closed and the valves 46 opened, whereupon low pressure steam will pass from pipe 41 through the connections just described into said coils 9 and 12 and out the drain connections into said pipe 50. If intermediate temperatures are desired, it is evident that a suitable manipulation of the valves 43 and 46 will so regulate the flow of steam in any one or in all the coil sections as to provide any rate of drying required. The valves 90, see Fig. 9, enable the operator to cut out any set of coils for repairs or to so throttle the steam as to produce any desired temperature.

The wet pulpy sheets of material being thus received at the wet end of the drier, are slowly conveyed by the rollers 8 in the manner disclosed between the upper and lower sets of heated coils 12 and 9 from said wet end to the dry end of the chamber illustrated in Fig. 7. The drying chamber being several hundred feet long the rate of travel of the sheets being dried is so regulated as to cause them to be perfectly dry when they reach said dry end. Accordingly, said dried sheets are received on a suitable platform 70 at said dry end and prepared for shipment.

An important feature of the invention resides in the hot air system which supplies hot air from the fans 60, 61, 62 and 63. This air in each section is drawn through a heater 64, 65, 66, or 67 associated with its corresponding section, and is blown by its fan from the rear end of its section to its forward end, so that the air travels in a direction opposite to the travel of the fiber board, until it finally escapes at the ventilators 72, 73, 74 or 75, thus exerting a maximum drying efficiency on the boards.

92, Fig. 1, represents a transparent window placed at intervals along the drier to facilitate an inspection of the drying operation.

It will now be clear that this drier enables one to pass continuously from a fiber board making machine a wet pulpy sheet 81 of, say, 10 or 15 feet in width to the drying chamber, and to continuously dry this traveling sheet over a length of several hundred feet in such a manner that the forward end will be finished drying while the portion entering the drying chamber is beginning to dry, so that the dried end portion may be cut off into suitable lengths and split up into suitable widths (by mechanism not shown) as fast as it leaves the drying chamber. The ball bearings 19 are important in this invention, for they enable the wet sheet having very little strength to be pushed by some of the rollers and to be pulled by others of the rollers without danger of buckling or tearing the very heavy traveling sheet. The hot water pipe 51, Fig. 10, conserves the great quantity of heat left in the condensed steam, and thus reduces the cost of the process.

As best shown in Figs. 5 and 6, a portion of the rollers 8 located near the wet end of the chamber, are not provided with sprockets 20. In fact, the rollers at the wet end are located very close together to support the weak and very wet board, while only every other roller is positively driven to prevent tearing or injuring said board. As the dry end of the chamber is approached, however, the board gets stronger and stronger, so the rollers are spaced farther and farther apart, and each one is positively driven, all as will be clear from Figs. 5, 6 and 7.

What is claimed is:

1. In a drier for heat insulating fiber boards, the combination of a frame work; a plurality of sets of conveyer rollers mounted for rotation in said frame work; a separate driving means for each set of rollers comprising a driving and a driven sprocket chain; a power shaft for driving a plurality of said driving chains; a plurality of sets of steam coils associated with said conveyer rollers; and means to admit high pressure or low pressure steam at will into each set of coils, substantially as described.

2. In a drier for heat insulating fiber boards, the combination of a frame work; a plurality of sets of conveyer rollers mounted for rotation in said frame work; a separate driving means for each set of rollers comprising a driving and a driven sprocket chain; means for maintaining said driven chain tight; a power shaft provided with worm connections for driving a plurality of said driving chains; a plurality of sets of steam coils associated with said conveyer rollers; and means to admit high pressure or low pressure steam at will into each set of coils, substantially as described.

3. In a drier for heat insulating fiber boards, the combination of a frame work; a plurality of sets of conveyer rollers mounted for rotation in said frame work; a separate driving means for each set of rollers comprising a driving and a driven sprocket chain; a power shaft for driving a plurality of said driving chains; a plurality of sets of steam coils associated with said conveyer rollers; means for enclosing said rollers and coils in a heat insulating chamber; means to blow air into said chamber; and means to admit high pressure or low pressure steam at will into each set of coils, substantially as described.

4. In a drier for heat insulating fiber boards, the combination of a frame work; a plurality of sets of conveyer rollers mounted for rotation in said frame work; a separate driving means for each set of rollers comprising sprockets on said rollers and a driving and a driven sprocket chain; a power shaft for driving a plurality of sa driving chains; a plurality of sets of steam coils associated with said conveyer rollers; means for forcing hot air over said rollers and coils; means constituting a chamber for confining said air; and means to admit high pressure or low pressure steam at will into each set of coils, substantially as described.

5. In a drier for heat insulating fiber boards, the combination of a series of roller conveyers located relatively close to each other at the wet end of the machine and progressively farther apart as the other end of said machine is reached; a plurality of driving means for driving a plurality of sections of said rollers; a plurality of heating means disposed adjacent to said rollers; and means for supplying air to said rollers, substantially as described.

6. In a drier for heat insulating fiber boards, the combination of a series of roller conveyers located relatively close to each other at the wet end of the machine and progressively farther apart as the other end of said machine is reached; ball bearings for said rollers; a plurality of driving means comprising a master sprocket chain and driving sprocket for driving a plurality of sections of said rollers; a plurality of heating means disposed adjacent to said rollers; and means for supplying air to said rollers, substantially as described.

7. In a drier for heat insulating fiber boards the combination of a series of roller conveyers located relatively close to each other at the wet end of the machine and progressively farther apart as the other end of said machine is reached; ball bearings on which said rollers are mounted; a plurality of driving means comprising driving and driven sprocket chains for driving a plurality of sections of said rollers; a plurality of heating means comprising upper and lower heating coils disposed adjacent to said rollers; and means for supplying air to said rollers, substantially as described.

8. In a drier for heat insulating fiber boards, the combination of a frame work; heat insulating material forming a drying chamber supported by said frame work; a plurality of sets of rollers constituting a conveyer and mounted for rotation on said frame work in said chamber; driving means for rotating the rollers in all the sets; a single power shaft for operating all of said driving means; a plurality of sets of heating coils located in said chamber in close proximity to said rollers; means for regulating the temperature of said coils; and a plurality of fans for supplying air to said chamber, substantially as described.

9. In a drier for heat insulating fiber boards, the combination of a frame work; heat insulating material forming a drying chamber supported by said frame work; a plurality of sets of rollers variably spaced constituting a conveyer and mounted for rotation on said frame work in said chamber; driving means comprising sprockets carried by said rollers and sprocket chains passing over said sprockets for rotating the rollers in said sets; a single power shaft for operating all of said driving means; a plurality of sets of heating coils located in said chamber in close proximity to said rollers; means for regulating the temperature of said coils; and a plurality of fans for supplying air to said chamber, substantially as described.

10. In a drier for heat insulating fiber boards, the combination of a frame work; heat insulating material forming a drying chamber supported by said frame work; a plurality of sets of rollers constituting a conveyer and mounted for rotation on said frame work in said chamber; driving means for rotating the rollers in said set; a single power shaft for operating all of said driving means; a plurality of sets of heating coils located in said chamber in close proximity to said rollers; high and low pressure steam connections to each coil; drain connections from each coil; means for regulating the temperature of said coils; and a plurality of fans and air heating means for supplying hot air to said chamber, substantially as described.

11. In a drier for heat insulating fiber boards, the combination of a plurality of conveyor rollers on which said boards may rest; means for rotating said rollers; means for heating said rollers; and means for supplying air to the boards on said rollers while in motion.

12. In a drier for heat insulating fiber boards, the combination of a plurality of conveyor rollers on which said boards may rest; means for rotating said rollers; means for heating said rollers; means for supplying air to the boards on said rollers while in motion; and an enclosing casing for said rollers and heating means.

13. In a drier for heat insulating fiber boards, the combination of a plurality of conveyor rollers on which said boards may rest; means comprising a power driven sprocket chain for rotating said rollers; means for heating said rollers; means for supplying air to the boards on said rollers while in motion; and a heat insulated enclosure surrounding said rollers and boards while the latter are being dried.

In testimony whereof I affix my signature.

TREADWAY B. MUNROE.